United States Patent [19]

La Scola et al.

[11] Patent Number: 4,777,205

[45] Date of Patent: Oct. 11, 1988

[54] ELECTRICALLY CONDUCTIVE COMPOSITIONS

[75] Inventors: Matthew A. La Scola, Sylvania, Ohio; John C. Getson, Adrian, Mich.

[73] Assignee: Wacker Silicones Corporation, Adrian, Mich.

[21] Appl. No.: 76,453

[22] Filed: Jul. 22, 1987

[51] Int. Cl.$^4$ ................................................ C08K 3/08
[52] U.S. Cl. ..................................... 524/440; 252/503; 252/511; 252/514; 524/449; 524/780; 524/789
[58] Field of Search ....................... 252/503, 511, 514; 524/440, 449, 789, 780

[56] References Cited

U.S. PATENT DOCUMENTS 4,011,360  3/1977  Walsh ................................. 524/588
4,250,075  2/1981  Monroe et al. ...................... 525/478

Primary Examiner—Melvyn I. Marquis

[57] ABSTRACT

An electrically conductive organopolysiloxane composition containing (1) an organopolysiloxane capable of being crosslinked, (2) a crosslinking agent capable of reacting with the organopolysiloxane, (3) from 120 to 200 parts by weight of silver coated mica particles per 100 parts by weight of organopolysiloxane (1) in which the silver coated mica particles contain from 50 to 80 percent by weight of silver based on the weight of the mica and (4) sufficient carbon black to stabilize the composition.

13 Claims, No Drawings

ELECTRICALLY CONDUCTIVE COMPOSITIONS

The present invention relates to a silicone composition and more particularly to an electrically conductive silicone composition containing silver coated particles.

BACKGROUND OF THE INVENTION

Electrically conductive room temperature curable compositions are described in U.S. Pat. No. 4,011,360 to Walsh, in which the composition contains a linear siloxane polymer of the formula $R'R_2SiO(R_2SiO)_xSiR_2R'$, where R is a monovalent hydrocarbon radical and each R' is a hydrogen atom, alkoxy radical, aryloxy radical, hydroxyl radical or acyloxy group and x is an average of from 50 to 10,000, an aminosilane or aminosilazane and electrically conductive particles containing a glass, ceramic and plastic core, which is coated with a noble metal.

Electrically conductive organopolysiloxane compositions are also described in U.S. Pat. No. 4,273,697 to Sumimura et al in which the composition contains (A) 100 parts of a curable liquid organopolysiloxane, (B) from 0.1 to 70 parts by weight of carbon black having a specific surface area of at least 900 m$^2$/g, (C) from 0 to 50 parts by weight of a hydroxyl endblocked polydiorganosiloxane whose degree of polymerization is 50 or less, and (D) a cross-linking agent for the curable organopolysiloxane.

Also, U.S. Pat. No. 4,250,075 to Monroe et al discloses electrically conductive compositions containing (A) vinyldiorganosiloxy endblocked polydiorganosiloxanes, (B) carbonaceous particles having an average diameter of less than 20 micrometers, (C) a polyorganohydrogensiloxane having an average of at least 2.1 silicon-bonded hydrogen atoms per molecule, (D) a platinum containing catalyst, and (E) a platinum catalyst inhibitor, in which at least 2 percent by weight of phenyl radicals are present based on the weight of the cured composition.

It has been found that when the electrically conductive curable organopolysiloxane compositions of the present invention contain silver coated mica, the compositions have a tendency to separate into two phases, an oily phase and a solid phase, and they are no longer thixotropic.

Therefore, it is an object of the present invention to provide electrically conductive organopolysiloxane compositions. Another object of the present invention is to provide room temperature vulcanizable electrically conductive compositions. A further object of the present invention is to provide electrically conductive curable organopolysiloxane compositions which are homogeneous. A still further object of the present invention is to provide a process for preparing stable electrically conductive curable organopolysiloxane compositions.

SUMMARY OF THE INVENTION

The foregoing objects and others which will become apparent from the following description are accomplished in accordance with this invention, generally speaking, by providing vulcanizable electrically conductive organopolysiloxane compositions containing (1) organopolysiloxanes which are capable of being crosslinked (2) a cross-linking agent which is capable of reacting with the crosslinkable organopolysiloxane (1), (3) from 120 to 200 parts by weight of silver coated mica particles per 100 parts by weight of organopolysiloxanes (1) in which the silver coated mica particles contain from 50 to 80 percent by weight of silver, based on the weight of mica and (4) a sufficient amount of an electrically conductive carbon black to stabilize the composition.

DESCRIPTION OF THE INVENTION

The organopolysiloxane compositions of this invention contain crosslinkable diorganopolysiloxanes, a crosslinking agent, silver coated mica particles containing from 50 to 80 percent by weight of silver, based on the weight of the mica and electrically conductive carbon black.

The diorganopolysiloxanes used in the present invention may be represented by the formula

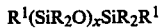

$$R^1(SiR_2O)_xSiR_2R^1$$

in which R represents the same or different monovalent hydrocarbon radicals, or substituted monovalent hydrocarbon radicals having from 1 to 18 carbon atoms, R$^1$ represents condensable groups, hydrolyzable groups, monovalent hydrocarbon radicals and monovalent hydrocarbon radicals having aliphatic unsaturation and x is a number greater than 10.

Although this is generally not shown in formulas of this type, siloxane units other than diorganosiloxane units (SiR$_2$O) may be present within or along the siloxane chain of the above formula. Examples of such other siloxane units which are generally present only as impurities are those of the formulas $RSiO_{3/2}$, $R_3SiO_{178}$ and $SiO_{4/2}$, where R is the same as above. It is preferred that siloxane units other than the diorganosiloxane units not exceed about 10 mole percent, and more preferably that they not exceed about 1 mole percent per mole of diorganopolysiloxane having condensable groups.

Examples of hydrocarbon radicals represented by R are alkyl radicals such as the methyl, ethyl, n-propyl and the isopropyl radical as well as octadecyl radicals; alkenyl radicals such as the vinyl and the allyl radicals; cycloaliphatic hydrocarbon radicals, such as the cyclopentyl and cyclohexyl radicals, as well as the methylcyclohexyl and cyclohexenyl radicals; aryl radicals such as the phenyl and xenyl radicals; aralkyl radicals such as the benzyl, betaphenylethyl and the beta-phenylpropyl radicals and alkaryl radicals such as the tolyl radical.

Examples of substituted hydrocarbon radicals represented by R are haloaryl radicals such as the chlorophenyl and bromophenyl radicals; and the cyanoalkyl radicals, such as the beta-cyanoethyl radical.

Preferably, the condensable groups represented by R$^1$ are hydroxyl groups which are preferably bonded to the terminal silicon atoms; however, they may be partially or totally substituted with condensable groups other than Si-bonded hydroxyl groups. Examples of other groups represented by R$^1$ are, hydrolyzable groups such as hydrocarbonoxy groups having from 1 to 10 carbon atoms and substituted hydrocarbonoxy groups having from 2 to 20 carbon atoms, such as the methoxyethyleneoxy radical. Other hydrolyzable groups which may be partially or totally substituted for the condensable groups are acyloxy groups, amino groups, aminoxy groups, acylamino groups, oxime groups and phosphato groups. These hydrolyzable groups need not be the same as the hydrolyzable groups which are present on the cross-linking agent.

Examples of hydrocarbonoxy groups represented by R$^1$ are methoxy, ethoxy, n-propoxy, isopropoxy, butoxy, hexyloxy, heptyloxy, octyloxy as well as vinyloxy, alloxy, ethylallyloxy, and isopropenyloxy radicals.

Examples of monovalent hydrocarbon radicals having aliphatic unsaturation are vinyl and allyl radicals.

The diorganopolysiloxanes have from about 1.8 to 2.25 organic groups per silicon atom and more preferably from about 1.9 to about 2.1 organic groups per silicon atom.

It is preferred that at least 50 percent, and more preferably at least 90 percent of the number of R radicals in the above formulas, that is, the SiC-bonded radical in the diorganopolysiloxane be methyl radicals.

It is possible to use mixtures consisting of various diorganopolysiloxanes in preparing the electrically conductive compositions of this invention.

The viscosity of the diorganopolysiloxanes employed in the compositions of this invention is preferably between 100 and 500,000 mPa.s at 25° C.

The hydroxyl-terminated organopolysiloxanes and their methods of preparation are described, for example, in U.S. Pat. Nos. 2,607,792 to Warrick and 2,843,555 to Berridge.

Any silicon compounds which can be stored under anhydrous conditions, but when exposed to water at room temperature, crosslink with the condensable groups on the diorganopolysiloxane to form elastomers, can be used as cross-linking agents for the diorganopolysiloxanes having condensable groups.

Crosslinking agents which may be used with the diorganopolysiloxanes containing condensable groups are silicon compounds having an average of more than two silicon-bonded hydrolyzable groups per molecule. Examples of such silicon compounds are silanes of the general formula $R_aSiX_{4-a}$, where R is the same as above, X represents a hydrolyzable group, a is 0, 1 or 2 and more preferably 0 or 1, and partial hydrolyzates of these silanes containing from 2 to 15 silicon atoms per molecule.

Examples of hydrolyzable groups represented by X are acyloxy groups (—OOCR′), hydrocarbonoxy groups (—OR′) and substituted hydrocarbonoxy groups (—OR″OR′), where R″ is a bivalent hydrocarbon radical having from 1 to 10 carbon atoms, such as the —(CH$_2$)$_2$ radical, aminoxy groups (—ONR$_2$′), amino groups (—NR$_2$′), acylamino groups (—NR″COR′), oximo groups (—N=CR$_2$′), phosphato groups [OOP(OR′)] and mixtures thereof. In these formulas R′ represents the same or different monovalent hydrocarbon radicals and substituted monovalent hydrocarbon radicals having from 1 to 10 carbon atoms. In at least some of the previously cited formulas at least one R′ may represent hydrogen. The examples of hydrocarbon radicals represented by R are equally applicable to hydrocarbon radicals represented by R′ and the examples of substituted hydrocarbon radicals represented by R are equally applicable to substituted hydrocarbon radicals represented by R′.

Examples of acyloxy groups having from 1 to 18 carbon atoms are formyloxy, acetoxy, propionyloxy, valeroyloxy, 2-ethylhexoyloxy, myristyloxy and stearoyloxy groups, with the acetoxy groups being the preferred acyloxy radicals.

Examples of hydrocarbonoxy groups are especially alkoxy groups having from 1 to 10 carbon atoms such as the methoxy, ethoxy, n-propoxy, isopropoxy, butoxy, hexyloxy, heptyloxy and octyloxy groups as well as other hydrocarbonoxy groups having from 2 to 10 carbon atoms such as vinyloxy, allyoxy, ethylallyloxy, isopropenyloxy, butadienyloxy an phenoxy groups.

An example of a hydrocarbonoxy-hydrocarbonoxy group is a methoxyethyleneoxy group.

Examples of aminoxy groups are dimethylaminoxy, dibutylaminoxy, dioctylaminoxy, dicyclohexylaminoxy, diphenylaminoxy, ethylmethylaminoxy, and methylphenylaminoxy groups.

Examples of amino groups are n-butylamino, sec-butylamino, and cyclohexylamino groups.

An example of an acylamino group is the benzoylmethylamino group.

Examples of oxime groups are acetaldoxime, acetophenoxime, acetonoxime, benzophenonoxime, 2-butanonoxime, diisopropylketoxime and chlorocyclohexanonoxime groups.

Examples of phosphato groups are dimethylphosphato, diethyl phosphato, di-n-butyl phosphato, dioctyl phosphato, methylethyl phosphato, methylphenyl phosphato and diphenyl phosphato radicals.

These compositions are often referred to as one-component room temperature vulcanizable compositions. Generally, these compositions are prepared under anhydrous conditions, by mixing the organopolysiloxanes having an average of at least two Si-bonded hydroxyl groups with a cross-linking agent having an average of more than two hydrolyzable groups per molecule, and a catalyst, if desired.

Examples of preferred cross-linking agents which may be employed in the compositions of this invention are methyltriacetoxysilane, tetraacetoxysilane, methyl-tert-butoxyacetoxysilicon compounds having a total of three tert-butoxy and acetoxy groups per molecule, methyltris-(cyclohexylamino)silane, methyltris-(sec-butylamino)silane, isopropoxytriacetoxysilane, methyltris-(2-butanonoximo)silane, methyltris(diethylphosphato)silane and methyltris-(isopropylamino)silane as well as methyltris-(diethylaminoxy)-silane.

Cross-linking may be accelerated by applying heat or in the case of the condensation system, by adding water in addition to that present in the atmosphere and/or carbon dioxide, where the cross-linking agent is an aminosilane or aminosiloxane.

In the two-component room temperature vulcanizable compositions, hydroxyl-terminated diorganopolysiloxanes are crosslinked by the addition of polyalkoxysilanes of the formula $(R^3O)_nSiR^2_{4-n}$ or polyalkoxysiloxanes in which the silicon atoms are linked through =Si—O—Si= linkages and the remaining valences of the silicon atoms are satisfied by R$^2$ and R$^3$O radicals and catalysts. In the above formula, R$^2$ is a monovalent hydrocarbon radical or a halogenated monovalent hydrocarbon radical having from 1 to 10 carbon atoms, R$^3$ is a monovalent hydrocarbon radical having from 1 to 10 carbon atoms, and n is 3 or 4. These compositions are often referred to as two-component room temperature vulcanizable compositions.

Examples of monovalent hydrocarbon radicals represented by R$^2$ are methyl, ethyl, propyl, butyl, hexyl, octyl, phenyl, vinyl, allyl, ethylallyl, as well as the corresponding halogenated groups such as chloromethyl, 2-bromo-4,6-diiodophenyl, 1,2-difluorovinyl, 3,4-difluorocyclopentyl, 2-bromocyclopentene-2,3-yl and 4-chlorohexyl. Examples of monovalent hydrocarbon radicals represented by $R^3$ are methyl, ethyl, propyl, butyl, hexyl, octyl and phenyl radicals.

The polyalkoxysilanes employed herein include monoorganotrihydrocarbonoxysilanes, tetrahydrocarbonoxysilanes and partial hydrolyzates thereof. Specific examples of polyalkoxysilanes are alkyl silicates, such as ethyltrimethoxysilane, methylbutoxydiethoxysilane, propyltripropoxysilane, methyltriethoxysilane, ethyltriethoxysilane, tetraethyl orthosilicate and tetra-n-butyl orthosilicate. Examples of organopolysilicates are ethyl polysilicate, isopropyl polysilicate, butyl polysilicate and partially hydrolyzed ethyl silicates such as "ethyl silicate 40", which consists primarily of decaethyltetrasilicate. Examples of polyalkoxysiloxanes are dimethyltetraethoxydisiloxane, trimethylpentabutoxytrisiloxane and the like. The polyalkoxysilanes and polyalkoxysiloxanes employed herein may be used either alone or in combination.

The crosslinking agents capable of racting with the condensable groups of the organopolysiloxane (1) are preferably employed in an amount of from about 0.5 to about 20 percent by weight and more preferably from about 1 to 10 percent by weight based on the weight of the diorganopolysiloxanes (1) having condensable groups.

These organopolysiloxane compositions are preferably prepared by mixing hydroxyl-terminated diorganopolysiloxanes with the crosslinking agents under anhydrous conditions. When the crosslinking agent is a polyalkoxysilane or polyalkoxysiloxane, then it is preferred that catalysts, such as metallic salts of organic carboxylic acids be employed. Examples of suitable acid radicals are those which yield the acetate, the butyrate, the octoate, the laurate, the linoleate, the stearate and the oleate. The metal ion of the metallic salt may consist of lead, tin, zirconium, antimony, iron, cadmium, barium, calcium, titanium, bismuth and manganese. Examples of suitable salts are tin naphthenate, lead octoate, tin octoate, iron stearate, tin oleate, antimony octoate, tin butyrate and the like. Other catalysts which may be used are bis-(acetoxybutylphenyltin)oxide, bis-(acetoxydibutyltin)oxide, bis-(tributyltin)oxide, bis-[tris-(o-chlorobenzyl)tin] oxide, dibutoxy dibutyltin, tris-t-butyltin hydroxide, triethyltin hydroxide, diamyl dipropoxytin, dibutyltin dilaurate, dioctyltin dilaurate, diphenyloctyltin acetate, dodecyldiethyltin acetate, trioctyltin acetate, triphenyltin acetate, triphenyltin laurate, triphenyltin methacrylate, dibutyltin butoxychloride and the like.

These catalysts may be dispersed in a solvent and then added to the hydroxyl-terminated diorganopolysiloxanes or they may be dispersed on a suitable filler or additive and thereafter milled with the polymer. Examples of suitable hydrocarbon solvents are benzene, toluene, xylene and the like; halogenated hydrocarbons such as perchloroethylene or chlorobenzene; organic ethers such as diethyl ether, dibutyl ether as well as hydroxyl free polysiloxane fluids. It is preferred that the solvents be of sufficient volatility to vaporize off at room temperature.

The amount of catalyst used may range from about 0.05 to about 10 percent by weight, preferably from about 0.1 to 2 percent by weight based on the weight of the composition. A mixture of two or more of the catalysts enumerated above may be used, if desired. The amount of catalysts added to the compositions are generally determined by the requirements of the particular job, especially the pot-life or working time required.

When the two-component compositions are stored prior to use, it is essential that either the catalyst or the cross-linking agent such as the polyalkoxysilane or polyalkoxysiloxane be stored separately. In other words, the diorganopolysiloxane having terminal Si-bonded hydroxyl groups, cross-linking agent, silver coated mica particles, carbon black, and other fillers may be compounded and the catalyst added just prior to use. In another method, the diorganopolysiloxane, catalyst, silver coated mica particles, carbon black and other fillers may be compounded and the cross-linking agent added just prior to use. Also, the carbon black and silver coated mica particles may be added either to the diorganopolysiloxane having terminal condensable groups or to the cross-linking agent prior to the addition of the catalyst, or immediately after the reactants have been combined.

When the organopolysiloxane compositions are cross-linked by the addition of Si-bonded hydrogen to an aliphatically unsaturated carbon-to-carbon group, the diorganopolysiloxane may be represented by the formula $$R^1(SiR_2O)_xSiR_2R^1,$$

where R and x are the same as above and $R^1$ is an aliphatically unsaturated radical.

Examples of hydrocarbon radicals represented by R or $R^1$ having aliphatic unsaturation are vinyl, allyl, methallyl and butadienyl radicals, with vinyl being the preferred radical.

where R is the same as above and x is a number greater than 10 and more preferably is a number such that the diorganopolysiloxane has a viscosity of from about 100 to 500,000 mPa.s at 25° C.

Organohydrogenpolysiloxanes employed as cross-linking agents in the compositions of this invention generally consist of units of the general formula $$R_m^4SiO_{(4-m/2)}$$

where $R^4$ represents hydrogen, a monovalent hydrocarbon radical or a halogenated monovalent hydrocarbon radical having from 1 to 18 carbon atoms, in which at least two and preferably three Si-bonded hydrogen atoms are present per molecule and m is 1, 2 or 3. Preferred compounds are those consisting of $R^4SiO_{1.5}$ units, $R_2^4SiO$— and $R_3^4SiO_{0.5}$— units, in which an Si-bonded hydrogen atom is present for each 3 to 100 silicon atoms and $R^4$ is the same as above. It is preferred that the organohydrogenpolysiloxanes have a viscosity of from about 10 to 50,000 mPa.s and more preferably from about 100 to 20,000 mPa.s at 25° C.

The organohydrogenpolysiloxanes may also contain monovalent hydrocarbon radicals having aliphatic unsaturation as well as Si-bonded hydrogen atoms in the same molecule.

It is preferred that the organohydrogenpolysiloxanes contain from 0.01 to about 1.7 percent by weight of Si-bonded hydrogen atoms, and the silicon valences not satisfied by hydrogen atoms or siloxane oxygen atoms are satisfied by unsubstituted or substituted monovalent hydrocarbon radicals free of aliphatic unsaturation.

The organohydrogenpolysiloxanes having an average of at least 2 Si-bonded hydrogen atoms per molecule are preferably present in the compositions of this invention in an amount of from about 0.1 to about 15 Si-bonded hydrogen atoms per aliphatically unsaturated group.

The platinum catalyst employed in these compositions may consist of finely dispersed platinum as well as platinum compounds and/or platinum complexes which have been used heretofore to promote the addition of Si-bonded hydrogen atoms to compounds having aliphatically unsaturated groups.

Examples of catalysts which can be used in this invention are finely dispersed platinum on carriers, such as silicon dioxide, aluminum oxide or activated charcoal, platinum halides, such as $PtCl_4$, chloroplatinic acid and $Na_2PtCl_4.nH_2O$, platinum-olefin complexes, for example, those with ethylene, propylene or butadiene, platinum-alcohol complexes, platinumstyrene complexes such as those described in U.S. Pat. No. 4,394,317 to McAfee et al, platinum-alcoholate complexes, platinum-acetylacetonate, reaction products comprising chloroplatinic acid and monoketones, for example, cyclohexanone, methyl ethyl ketone, acetone, methyl-n-propyl ketone, diisobutyl ketone, acetophenone and mesityl oxide, as well as platinumvinylsiloxane complexes, such as platinum-divinyltetramethyldisiloxane complexes with or without a detectable amount of inorganic halogen.

Mixtures of various platinum catalysts, for example, a mixture consisting of the reaction product of chloroplatinic acid and cyclohexanone and a platinum-divinyltetramethyldisiloxane complex which is free of detectable inorganic halogen may be used in the compositions of this invention.

The platinum catalyst is generally employed in an amount of from about 0.5 to 300 ppm by weight and more preferably from about 2 to 50 ppm by weight calculated as platinum and based on the weight of the diorganopolysiloxane.

These compositions are prepared by mixing the organopolysiloxanes containing aliphatic unsaturation with the organohydrogenpolysiloxane in the desired proportions and the desired amount of catalyst is added and the reaction mixture is maintained at the desired reaction temperature for sufficient time to effect the addition of the Si-bonded hydrogen atoms across the multiple bonds of the aliphatically unsaturated organopolysiloxanes. The relative amounts of the Si-bonded hydrogen containing compound and the compound containing aliphatic unsaturation can vary within extremely wide limits. Theoretically, one Si-bonded hydrogen atom is equivalent to one olefinic double bond. For many purposes, however, it may be desirable to employ an excess of one of the reactants to facilitate the completion of the reaction or to insure that the reaction product still contain either unreacted Si-bonded hydrogen atoms or aliphatically unsaturated groups. Because of the high activity of the platinum catalysts, some degree of reaction often occurs at room temperature as soon as the catalyst is mixed with the reactants. Thus, the reaction temperature can be room temperature or even at a temperature as low as 0° C. Likewise, a reaction temperature on the order of from 150° to 300° C. can be employed. Preferably, however, the reaction is effected at temperatures in the range of from about 50° to 150° C. The time required for effecting the reaction depends on such things as the reactants employed and the amount and type of catalyst employed.

In some cases, it is desirable to employ a diluent for the catalyst and/or one or both reactants. The diluent should be inert to the reactants and catalyst under the reaction conditions. Examples of suitable diluents are organopolysiloxanes such as trimethylsiloxy-terminated dimethylpolysiloxanes and organic solvents which vaporize at low temperatures. Examples of suitable organic solvents are chlorinated hydrocarbons such as trichloroethylene. When organic solvents are employed, they are preferably employed in an amount of less than 20 percent by weight based on the weight of the organopolysiloxane composition.

The addition of the Si-bonded hydrogen atoms to the aliphatically unsaturated groups may be inhibited or at least controlled by the addition of an inhibitor to the composition. Various compounds which may be used to inhibit platinum catalyzed addition reactions are benzotriazole; acetylenic compounds such as acetylenically unsaturated secondary or tertiary alcohols and siloxanes such as 1,3-divinyl-1,1,3,3-tetramethyldisiloxane. Other compounds which may be employed are tetramethylquanidine acetate, ethylenically unsaturated isocyanurate, phenylhydrazine, a diaziridine dithiocarbamic acids, thiuram monosulfides, 2-mercaptobenzothiazole and the like.

The amount of inhibitor used may be varied depending on such characteristics as the type and amount of platinum catalyst used, the degree of inhibition desired to be imparted to the platinum catalyst and often the type of unsaturated polysiloxane and hydrogen polysiloxane employed. Generally, the amount of inhibitor employed can range from about 0.001 to about 6 percent by weight and more preferably from about 0.01 to about 5 percent by weight based on the weight of the composition.

Organopolysiloxanes which are cross-linked in the presence of peroxides may also be employed in this invention. The organopolysiloxanes are preferably diorganopolysiloxanes having the following formula

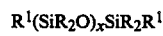

where R and x are the same as above and $R^1$ is a monovalent hydrocarbon radical or a radical having aliphatic unsaturation.

These organopolysiloxanes are essentially linear polymers containing diorganosiloxane units of the formula $R_2SiO$; however, they may also contain minor amounts, generally not more than about 2 mol percent of other units, such as $RSiO_{3/2}$ units, $R_3SiO_{0.5}$ and/or $SiO_{4/2}$ units, in which R is the same as above. Included specifically in the above formula are the dimethylpolysiloxanes, methylphenylpolysiloxanes, methylvinylpolysiloxanes, and copolymers of such units, such as copolymers containing dimethyl- and phenylmethylsiloxane units and copolymers containing phenylmethyl-, dimethyl- and vinylmethylsiloxane units. These organopolysiloxanes are well known in the art and methods for producing such materials are old and widely described in the literature.

Agents which may be added to the organopolysiloxane compositions to effect rapid conversion of the composition to an elastomer are organic peroxides, such as benzoyl peroxide, t-butyl perbenzoate, bis-(2,4- dichlorobenzoyl)peroxide, dicumyl peroxide, dialkyl peroxides, such as di-t-butyl peroxide, p-chlorobenzoyl peroxide, etc. These cross-linking agents may be present in amounts ranging from about 0.1 to as high as 4 to 8 percent by weight or even more based on the weight of the organopolysiloxanes.

Various antistructuring agents may also be incorporated in the compositions of this invention to prevent hardening or "crepe aging" of the materials prior to vulcanization. Examples of suitable antistructuring agents are water; hydroxyl-terminated silanes and siloxanes having a viscosity of from about 30 to 100 centistokes, such as diphenylsilane diols, methylphenylsilane diols, hydroxylated methylpolysiloxanes, hydroxylated methylphenylpolysiloxanes, hydroxylated diphenylpolysiloxanes; methyl endblocked dimethylpolysiloxane fluids, low molecular weight alkoxylated siloxanes; phosphate fluids, such as tripropylphosphate and tributylphosphate; glycols, such as methylene glycol and propylene glycol; esters; and anhydrides, such as phthalic anhydride.

The amount of antistructuring agents employed in these compositions generally ranges from about 2 to 30 percent, preferably from about 5 to 20 percent by weight based on the weight of the organopolysiloxanes.

The silver coated mica particles employed in the compositions of this invention contain from about 50 to about 80 weight percent of silver based on the weight of the mica. These particles have a surface area of about 0.26 $m^2/cc$ and an average particle size of about 30 microns. The particle size is not critical as long as the particles are not so large as to be difficult to mix with the diorganopolysiloxane to form a homogeneous mixture.

The amount of silver coated mica particles incoporated in the compositions of this invention may range rrom about 120 to 200 parts by weight of silver coated mica particles per 100 parts by weight of the crosslinkable diorganopolysiloxane (1). Preferably the amount of silver coated mica particles may range from about 130 to about 175 parts by weight per 100 parts by weight of diorganopolysiloxane(1). Obviously the greater the amount of silver coated mica particles, the better the conductivity; however, when the amount exceeds about 200 parts by weight per 100 parts by weight of diorganopolysiloxane (1), the composition becomes very viscous and is difficult to apply.

It has been discovered that when the compositions of this invention contain silver coated mica particles, the composition has a tendency to separate into two phases, an oily phase and a solid phase and is no longer thixotropic. It has, however, been found that the compositions of this invention can be stabilized and retain their thixotropic properties by the addition of electrically conductive carbon black.

Examples of carbon blacks which may be employed in the compositions of this invention are furnace type carbon black and acetylene black.

A commercial form of furnace type carbon black is Ketjenblack ™ EC and a commercial form of acetylene black is Shawinigan ® acetylene black.

The carbon black preferably has a surface area of from about 40 to 1500 $m^2/g$ and more preferably from about 500 to 1000 $m^2/g$.

In addition to the carbon black, the electrically conductive compositions of this invention may also contain graphite which has a surface area of from 3 to 50 $m^2/g$ and more preferably from 8 to 15 $m^2/g$.

Although the amount of carbon black is not critical, it is preferred that a sufficient amount be present to stabilize the composition. Generally, an amount of from 1 to 8 parts by weight, and more preferably from 2 to 6 parts by weight per 100 parts by weight of diorganopolysiloxane (1) are sufficient to form a stable, homogeneous thixotropic composition.

Mixtures of carbon blacks, as well as mixtures of carbon blacks and graphite may be employed in the compositions of this invention.

In addition to the diorganopolysiloxane (1), cross-linking agents (2), silver coated mica particles (3) and carbon black (4), the compositions of this invention may also contain other additives which have been used heretofore in vulcanizable electrically conductive organopolysiloxane compositions.

Other additives which may be employed in the compositions of this invention are reinforcing fillers, i.e., fillers having a surface area of at least 50 $m^2/g$. Examples of such fillers are precipitated silicon dioxide having a surface area of at least 50 $m^2/g$ and/or pyrogenically produced silicon dioxide. Examples of other reinforcing fillers are the aerogels and alumina.

A portion of the fillers can be semi- or non-reinforcing fillers, i.e., fillers which have a surface area of less than 50 $m^2/g$. Examples of semi- or non-reinforcing fillers are metal oxides, metal nitrides, glass beads, bubbles or fibers, metallic flakes, powders and fibers such as copper, nickel and aluminum, cork, organic resins, polytetrafluoroethylene, polychlorotrifluoroethylene, polyvinyl chloride, bentonite, diatomaceous earth, crushed quartz, mica, and mixtures thereof. Preferred examples of metal oxide fillers are zinc oxide, ferric oxide, alumina and titanium oxide. The fillers may also be treated with, for example, trialkylalkoxysilanes, such as trimethylethoxysilane to coat the surfaces with organosiloxy groups.

The amount of fillers which may be incorporated in the compositions of this invention is not critical and may vary over a wide range. Thus, the amount of filler may range from about 0 to 150 percent by weight and more preferably from about 20 to 120 percent by weight, based on the weight of the diorganopolysiloxane (1). It is however, preferred that the fillers employed in the compositions of this invention not interfere with the electrical conductivity of the resultant compositions.

Other additives which can be incorporated in the compositions of this invention include pigments, compression set additives, oxidation inhibitors, plasticizers, adhesion promoters, base stabilizers and other materials commonly employed as additives in the silicone rubber art. Such additives are preferably present in an amount below about 15 percent by weight, based on the weight of the composition.

In order to facilitate mixing of the ingredients in the compositions of this invention, the cross-linking agents and/or the cross-linking catalysts can be dissolved or dispersed in a diluent which is inert with respect to the reactants and the catalysts employed. Examples of suitable diluents or dispersing agents are organopolysiloxanes, such as dimethylpolysiloxanes having trimethylsiloxy terminal groups and diluents which evaporate at room temperature. Examples of suitable diluents are chlorinated hydrocarbons such as trichloroethylene. When diluents are employed, they are preferably employed in an amount of less than about 20 percent by weight, based on the weight of the composition to be cross-linked.

The compositions of this invention may be used in many applications where it is necessary or desirable to have an electrically conductive elastomer. Specific applications where these compositions may be employed are as electrically conductive gaskets, as electrically conductive adhesives, as encapsulating agents for electronic components and as cores for ignition cables. These compositions are especially useful in silk-screening processes in preparing electronic circuits.

In the following examples, all parts and percentages are by weight, unless otherwise specified.

EXAMPLE 1

A room temperature vulcanizable composition is prepared by mixing 150 parts of silver coated mica particles (available from Potters Industries, Inc.) and 3 parts of carbon black (available from Armak Company as Ketjenblack TM EC) having an average particle size of 420±25 microns with 100 parts of hydroxyl-terminated polydimethylsiloxane (2000 mPa.s at 25° C.), 8 parts of methyl-tris-(sec-butylamino)silane, 3 parts of dimethyldi-(sec-butylamino)silane and 0.5 parts of aminopropyltrimethoxysilane at room temperature under a nitrogen atmosphere. The composition is de-aired and placed in sealed tubes and stored at room temperature for 14 days. After 14 days, a sample is removed from a tube. No separation of the composition is observed. A sample is then molded into test slabs and then cured for 7 days. The physical properties and the electrically conductive properties are shown in the table.

TABLE

| Durometer | 52 |
| --- | --- |
| Tensile strength, psi. | 243 |
| Elongation, percent | 118 |
| Modulus, psi | 234 |
| Tear, ppi | 36 |
| Electrical conductivity, ohm-cm | $4.5 \times 10^{-4}$ |

EXAMPLE 2

The procedure of Example 1 is repeated, except that 130 parts of silver coated mica particles are substituted for 150 parts of silver coated mica particles, 3.6 parts of carbon black (Ketjenblack TM EC) are substituted for 3 parts of carbon black and about 10 parts of odorless mineral spirits are added to the composition. The composition is de-aired and stored in sealed tubes at room temperature for 14 days. When a sample is squeezed from the tube, no separation of the composition is observed. The electrical conductivity of the resultant elastomer is essentially the same as in Example 1.

EXAMPLE 3

The procedure of Example 1 is repeated, except that the 3 parts of dimethyldi(sec-butylamino)silane is omitted. The composition is de-aired and stored at room temperature in sealed tubes for 14 days. When a sample is removed from a sealed tube, no phase separation is observed. The electrical conductivity of the resultant elastomer is $5.8 \times 10^{-3}$ ohm-cm.

EXAMPLE 4

The procedure of Example 1 is repeated, except that 1 part of carbon black (Ketjenblack TM EC) is substituted for the 3 parts of carbon black. The resultant composition is deaired and stored in sealed tubes for 14 days. After 14 days, a sample squeezed from the tube showed no visible signs of separation.

EXAMPLE 5

The procedure of Example 1 is repeated, except that a hydroxyl-terminated polydimethylsiloxane having a viscosity of 4000 mPa.s at 25° C. is substituted for the hydroxyl-terminated polydimethylsiloxane having a viscosity of 2000 mPa.s at 25° C. The resultant composition is de-aired and stored in sealed tubes for 14 days. After 14 days, a sample squeezed from the tube appeared to be homogeneous.

EXAMPLE 6

The procedure of Example 1 is repeated, except that 8 parts of methyl-tris-(cyclohexylamino)silane is substituted for the 8 parts of methyl-tris-(sec-butylamino)silane. The composition is de-aired and stored at room temperature in sealed tubes for 14 days. When a sample is removed from the sealed tube, no phase separation is observed.

EXAMPLE 7

The procedure of Example 6 is repeated, except that 8 parts of methyltris-(2-butanonoximo)silane is substituted for the methyltris-(cyclohexylamino)silane. No phase separation is observed after being stored in sealed tubes for 14 days at room temperature.

EXAMPLE 8

The procedure of Example 6 is repeated, except that parts of methyltris-(diethylaminoxy)silane is substituted for the methyltris-(cyclohexylamino)silane. No phase separation is observed after being stored in sealed tubes for 14 days.

EXAMPLE 9

The procedure of Example 1 is repeated, except that 200 parts of silver coated mica are substituted for the 150 parts of silver coated mica, 12 parts of methyl-tris-(secbutylamino)silane are substituted for 8 parts of methyl-tris-(sec-butylamino)silane and 24 parts of dimethyldi-(sec-butylamino)silane are substituted for 3 parts of dimethyldi-(secbutylamino)silane. The resultant composition is de-aired and placed in sealed tubes for 14 days. After 14 days a sample is removed having no visible signs of separation and cured for 7 days at room temperature in the presence of atmospheric moisture. The electrical conductivity of the cured composition is $4 \times 10^{-3}$ ohm-cm.

Comparison Example $V_1$

The procedure of Example 1 is repeated, except that 100 parts of a hydroxyl-terminated polydimethylsiloxane having a viscosity of 20,000 mPa.s at 25° C. is substituted for 100 parts of a hydroxyl-terminated polydimethylsiloxane having a viscosity of 2,000 mPa.s at 25° C. The resultant composition is de-aired and placed in sealed tubes for 14 days. After 14 days, a sample is removed which had separated into an oily phase and a solid phase. The sample is cured for 7 days at room temperature in atmospheric moisture. The electrical conductivity of the cured composition is $2 \times 10^{-3}$ ohm-cm.

Comparison Example V₂

The procedure of Comparison Example V₁ is repeated, except that 100 parts of silver coated mica are substituted for 150 parts of silver coated mica. The resultant composition is de-aired and placed in sealed tubes for 14 days. After 14 days, a sample is removed which had separated into an oily phase and a solid phase. After curing for 7 days at room temperature in the presence of atmospheric moisture, the electrical conductivity of the cured composition is $6.5 \times 10^{-1}$ ohm-cm.

Comparison Example V₃

A composition is prepared by mixing 150 parts of silver coated mica particles with 100 parts of hydroxyl-terminated polydimethylsiloxane (2000 mPa.s at 25° C.), 8 parts of methyl-tris-(sec-butylamino)silane and 3 parts of dimethyldi-(sec-butylamino)silane under an atmosphere of nitrogen. The resultant composition is de-aired and placed in sealed tubes and stored at room temperature for 14 days. After 14 days a sample removed from the tube indicated that the composition had separated into an oily phase and a solid phase.

Comparison Example V₄

The procedure of Example V₃ is repeated, except that the hydroxyl-terminated polydimethylsiloxane polymer has a viscosity of 20000 mPa.s at 25° C. After being stored in sealed tubes for 14 days, the composition separated into two phases, an oily phase and a solid phase.

Comparison Example V₅

The procedure of Comparison Example V₃ is repeated, except that the dimethyldi(sec-butylamino)silane is omitted. After being stored in sealed tubes for 14 days at room temperature, separation of the composition is observed.

Comparison Example V₆

The procedure of Comparison Example V₅ is repeated, except that 15 parts of odorless mineral spirits are added to the composition. After being de-aired, the composition is placed in sealed tubes and stored for 14 days. After 14 days, separation of the composition is observed.

Comparison Example V₇

The procedure of Comparison Example V₁ is repeated, except that only 130 parts of silver coated mica particles are used and 2 parts of fumed silica which has been treated with hexamethyldisilazane is added to the composition. The resultant composition is de-aired and placed in sealed tubes for 14 days. After 14 days, some separation of the composition into an oily phase and a solid phase is observed. The composition is molded into test specimens and exposed to atmospheric moisture at room temperature for 7 days. The electrical conductivity is $1.6 \times 10^{-1}$ ohm-cm.

EXAMPLE 10

A room temperature vulcanizable composition is prepared by mixing 150 parts of silver coated mica particles (available from Potters Industries, Inc.) and 3 parts of carbon black (available from Armak Company as Ketjenblack TM EC) having an average particle size of $420 \pm 25$ microns with 100 parts of hydroxyl-terminated polydimethylsiloxane (2000 mPa.s at 25° C.) and 5 parts of an "ethyl silicate 40" (available, e.g., as ethylsilicate TES from Wacker-Chemie GmbH) at room temperature for about 1 hour. The resultant composition is de-aired, placed in sealed tubes and stored for 14 days at room temperature. After 14 days, about 50 parts of the resultant composition is removed from a tube and mixed with about 1.2 parts of dibutyltin butoxy chloride. The composition cured to a solid elastomer with no visible indication that the composition separated in the tube.

EXAMPLE 11

The procedure described in Example 10 is repeated, except that 100 parts of a hydroxyl-terminated polydimethylsiloxane having a viscosity of 4000 mPa.s at 25° C. is substituted for the polydimethylsiloxane having a viscosity of 2000 mPa.s at 25° C. The resultant composition is stored in the absence of a catalyst for 14 days in sealed tubes at room temperature. After 14 days, no separation of the composition is observed.

EXAMPLE 12

A room temperature vulcanizable composition is prepared by mixing 100 parts of silver coated mica particles having an average particle size of 30 microns and 8 parts of carbon black (Ketjenblack TM EC) with 100 parts of a hydroxyl-terminated polydimethylsiloxane having a viscosity of 4000 mPa.s at 25° C. and 16 parts of a trimethylsiloxy-endblocked polydimethylsiloxane having a viscosity of 100 mPa.s at 25° C. at room temperature for about 1 hour. The resultant composition is de-aired, placed in sealed tubes and stored for 14 days at room temperature. After 14 days, no separation of the composition is observed. About 2 parts of a composition containing about 25 percent by weight of a trimethylsiloxy-containing endblocked polydimethylsiloxane having a viscosity of 100 mPa.s at 25° C., about 45 percent by weight of tetra-n-propylsilicate and 30 percent by weight of dibutyltin diversatate are mixed with the resultant composition and cured at room 5. temperature. The composition cured to a solid elastomer.

EXAMPLE 13

The procedure of Example 10 is repeated, except that 112 parts of a hydroxyl-terminated polydimethylsiloxane having a viscosity of 450 mPa.s at 25° C. are substituted for the hydroxyl-terminated polydimethylsiloxane having a viscosity of 2000 mPa.s at 25° C. The resultant composition is stored in sealed tubes in the absence of a catalyst for 14 days. After 14 days, there is no visible indication of separation of the composition. About 50 parts of the composition is mixed with about 1.2 parts of dibutyltin butoxy chloride and exposed at room temperature to atmospheric moisture. The composition cured to a solid elastomer.

EXAMPLE 14

The procedure described in Example 10 is repeated, except that 2 parts of carbon black (Ketjenblack TM EC) and 1 part of graphite are substituted for the 3 parts of carbon black. After being stored for 14 days in sealed tubes in the absence of a catalyst, the composition did not show any evidence of separation.

EXAMPLE 15

(a) An organopolysiloxane composition is prepared by mixing 100 parts of a vinyl-terminated polydimethylsiloxane having a viscosity of about 1000 mPa.s at 25° C. and having a vinyl content of about 0.4 weight percent with about 5 parts of carbon black (Ketjenblack ™ EC) and about 130 parts of silver coated mica particles. The resultant composition is de-aired and stored in a sealed container for 14 days. After 14 days, no separation of the composition is observed.

(b) About 100 parts of the composition prepared in (a) above are mixed with 10 parts of a methylhydrogenpolysiloxane having a viscosity of about 100 mPa.s at 25° C. and having an SiH mole ratio of 3:2 to form a homogeneous composition. A sufficient amount of chloroplatinic acid is added so that the composition contains about 10 ppm of platinum based on the organopolysiloxane. The resultant composition is molded and heated to about 120° C. to form an elastomer.

Comparison Example $V_8$

The procedure of Example 15(a) is repeated, except that the carbon black is omitted. After being stored for 14 days, the composition separated into two phases, an oily phase and a solid phase.

EXAMPLE 16

A composition is prepared by mixing 90 parts of a vinyl-terminated polydimethylsiloxane having a viscosity of about 4000 mPa.s at 25° C. and having a vinyl content of about 0.08 weight percent with 8 parts of a methylvinyldimethylpolysiloxane diol having a viscosity of about 40 mPa.s at 25° C. and containing about 3.5 weight percent OH and having a vinyl content of about 2 weight percent with 20 parts of a trimethylsiloxy-terminated polydimethylsiloxane having a viscosity of 2000 mPa.s at 25° C., 4 parts of carbon black (Ketjenblack ™ EC), 130 parts of silver coated mica particles and 4 parts of dicumyl peroxide to form a homogeneous composition. The resultant composition is de-aired and stored in a closed container for 14 days. After 14 days, no separation of the composition is observed. The resultant composition is then molded and cured for 30 minutes at 175° C. to form an elastomer.

Comparison Example $V_9$

The procedure of Example 16 is repeated, except that the carbon black is omitted. After 14 days storage in a closed container, the composition separated into an oily phase and a solid phase.

What is claimed is:

1. An electrically conductive curable organopolysiloxane composition comprising (1) an organopolysiloxane capable of being cross-linked, (2) a cross-linking agent which reacts with the organopolysiloxane (1) to form an elastomer, (3) silver coated mica particles in an amount of from 120 to 200 parts by weight per 100 parts by weight of organopolysiloxane (1) and (4) a sufficient amount of carbon black to prevent the composition from separating into two phases.

2. The composition of claim 1, wherein the organopolysiloxane (1) is represented by the formula $$R^1(SiR_2O)_xSiR_2R^1$$

where R is selected from the group consisting of monovalent hydrocarbon radicals and substituted monovalent hydrocarbon radicals having from 1 to 18 carbon atoms, $R^1$ is a hydroxyl group and x is an integer having a value of at least 10.

3. The composition of claim 2, wherein $R^1$ is a hydroxyl group and the cross-linking agent is a silane of the formula $$R_aSiX_{4-a}$$

where R is selected from the group consisting of a monovalent hydrocarbon radical and a halogenated monovalent hydrocarbon radical having from 1 to 18 carbon atoms, X is a hydrolyzable group and a is 0 or 1.

4. The composition of claim 2, wherein $R^1$ is a hydroxyl group and the cross-linking agent is selected from the group consisting of a polyalkoxysilane of the formula $$(R^3O)_nSiR_{4-n}^2$$

and a polyalkoxysiloxane, in which the silicon atoms are linked through $=^{13}Si-O-Si^{13}=$ linkages and the remaining valences of the silicon atoms are satisfied by $(R^2)$ and $(R^3O)$ radicals, where $R^2$ is selected from the group consisting of a monovalent hydrocarbon radical having from 1 to 10 carbon atoms and a halogenated monovalent hydrocarbon radical having from 1 to 10 carbon atoms, $R^3$ is a monovalent hydrocarbon radical having from 1 to 10 carbon atoms, n is 3 or 4, and the composition further contains a metallic salt of an organic carboxylic acid as a catalyst.

5. The composition of claim 4, wherein the catalyst is an organic tin compound.

6. The composition of claim 1, wherein the carbon black has a surface area of from 40 to 1500 m²/g.

7. The composition of claim 2, wherein the organopolysiloxane (1) is a hydroxyl-terminated polydimethylsiloxane.

8. The composition of claim 1, wherein the carbon black is present in an amount of from 1 to 8 parts by weight per 100 parts by weight of organopolysiloxane (1).

9. The composition of claim 1, wherein the composition contains carbon black in an amount of from 2 to 6 parts by weight per 100 parts by weight of organopolysiloxane (1) and graphite in an amount of from 0 to 5 parts by weight per 100 parts by weight of organopolysiloxane (1).

10. The composition of claim 3, wherein the cross-linking agent has an average of more than two hydrolyzable groups per molecule, selected from the group consisting of hydrocarbonoxy groups, substituted hydrocarbonoxy groups, acyloxy groups, amino groups, oximo groups, aminoxy groups, acylamino groups and phosphato groups.

11. The composition of claim 1, wherein the organopolysiloxane (1) is represented by the formula $$R^1(SiR_2O)_xSiR_2R^1$$

where R is selected from the group consisting of monovalent hydrocarbon radicals and substituted monovalent hydrocarbon radicals having from 1 to 18 carbon atoms, $R^1$ is a monovalent hydrocarbon raicals having aliphatic unsaturation and the cross-linking agent is an organohydrogenpolysiloxane of the formula

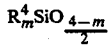

where $R^4$ is selected from the group consisting of hydrogen, monovalent hydrocarbon radicals and halogenated monovalent hydrocarbon radicals having from 1 to 18 carbon atoms in which at least two of the $R^4$ groups are hydrogen and m is 1, 2 or 3 and further contains a platinum catalyst.

12. The composition of claim 1, wherein the organopolysiloxane (1) is represented by the formula

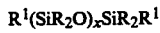

where R is selected from the group consisting of monovalent hydrocarbon radicals and substituted monovalent hydrocarbon radicals having from 1 to 18 carbon atoms, $R^1$ is selected from the group consisting of a monovalent hydrocarbon and, monovalent hydrocarbon radical having aliphatic unsaturation and the crosslinking agent is a peroxide.

13. A method for preparing a silicone elastomer having electrically conductive properties which comprises mixing (1) an organopolysiloxane having terminal hydroxyl groups with (2) a silicon compound having an average or more than two silicon-bonded hydrolyzable groups per molecule which is capable of reacting with organopolysiloxane (1), (3) silver coated mica particles in an amount of from about 120 to 200 parts by weight per 100 parts by weight of organopolysiloxane (1), in which the mica particles contain at least 50 percent by weight of silver based on the weight of mica, and (4) a sufficient amount of carbon black to prevent the composition from separating into two phases, and thereafter exposing the resultant composition to atmospheric moisture.

* * * * *